United States Patent
Scholl

(10) Patent No.: US 7,551,627 B2
(45) Date of Patent: Jun. 23, 2009

(54) OFFLOADING ROUTING FUNCTIONS FROM NETWORK ROUTERS

(75) Inventor: Thomas Scholl, New Haven, CT (US)

(73) Assignee: AT&T Intellecutal Property I, L.P., Reno, NV (US)

(*) Notice: Subject to any disclaimer, the term of this patent is extended or adjusted under 35 U.S.C. 154(b) by 601 days.

(21) Appl. No.: 11/281,623

(22) Filed: Nov. 18, 2005

(65) Prior Publication Data

US 2008/0013551 A1   Jan. 17, 2008

(51) Int. Cl.
H04L 12/28 (2006.01)

(52) U.S. Cl. .................. 370/400; 709/202; 709/223; 709/244

(58) Field of Classification Search .................. None
See application file for complete search history.

(56) References Cited

U.S. PATENT DOCUMENTS

| | | | |
|---|---|---|---|
| 6,173,324 B1 | 1/2001 | D'Souza | |
| 6,260,070 B1 | 7/2001 | Shah | |
| 6,434,624 B1 | 8/2002 | Gai et al. | |
| 7,139,242 B2 * | 11/2006 | Bays | 370/238 |
| 7,330,474 B2 * | 2/2008 | Moon et al. | 370/401 |
| 7,376,154 B2 * | 5/2008 | Ilnicki et al. | 370/488 |
| 2002/0165957 A1 * | 11/2002 | Devoe et al. | 709/224 |
| 2005/0047413 A1 * | 3/2005 | Ilnicki et al. | 370/392 |
| 2005/0201302 A1 * | 9/2005 | Gaddis et al. | 370/254 |
| 2005/0232230 A1 * | 10/2005 | Nagami et al. | 370/351 |
| 2006/0092940 A1 * | 5/2006 | Ansari et al. | 370/392 |
| 2006/0174035 A1 * | 8/2006 | Tufail | 709/239 |

* cited by examiner

Primary Examiner—Daniel J Ryman
Assistant Examiner—Brian Roberts
(74) Attorney, Agent, or Firm—Greenblum & Bernstein, P.L.C.

(57) ABSTRACT

A system monitors signaling data transmitted between routers. The system includes at least one router that communicates signaling data via a session with at least one other router. The system also includes a network element that receives a copy of the signaling data via a control session established with the at least one router. The sessions, including the control session, can be border gateway protocol (BGP) sessions. The network element can also operate as a BGP control server or a centralized policy manager.

12 Claims, 2 Drawing Sheets

OFFLOADING ROUTING FUNCTIONS FROM NETWORK ROUTERS

BACKGROUND OF THE INVENTION

1. Field of the Invention

The present invention relates to network routers. More particularly, the present disclosure relates to offloading control information from routers, performing external processing, and centrally administering routing policy.

2. Background Information

As the Internet continues its rapid expansion, faster processors within routers are needed. It would be desirable to offload complicated route policy and route calculation to an alternate network element. Currently there is no method to "relay" border gateway protocol (BGP) information to a central policy server for further best-path calculation processing. Today, operators would have to make static configurations to force a peer network to establish BGP peering with a central policy server.

In order to capture all data on a BGP session, an operator would need to either deploy passive or in-line "sniffers" to capture data on the wire. With some routers involved in edge/border operations (the demarcation between autonomous systems or networks), a router may have anywhere from several to a hundred BGP sessions. With numerous BGP peers, it is difficult to deploy data analysis devices for each peer.

Another method for operators to capture BGP data would be to enable a debug/trace mode on the router, where detailed logging could be captured. While this can provide valuable information, the simple enabling of such a capability may have a negative impact, as additional processing is required. Also, any debug mode would result in creation of additional logs that may need to be stored locally or transferred across the network. Debug/trace logs are usually clear-text and provide much more information than an operator typically requires.

Another problem with current monitoring systems is that they only receive from their border routers the "best routes", specifically, routes that the router has chosen to be inserted into the routing information base (RIB). These routes are the routes to which the router decides to forward traffic. This does not give a clear view to an operator of all available paths.

Currently, network operators are dependent on long route-maps/route-policy statements that have dependencies to other parts of the router configuration (e.g., community lists). Traditionally, very customized and flexible route-maps can be several pages long. This can make troubleshooting difficult for operators.

Accordingly, there is a need for a (BGP) routing policy manager, relay and monitor.

DETAILED DESCRIPTION

Figure 1:
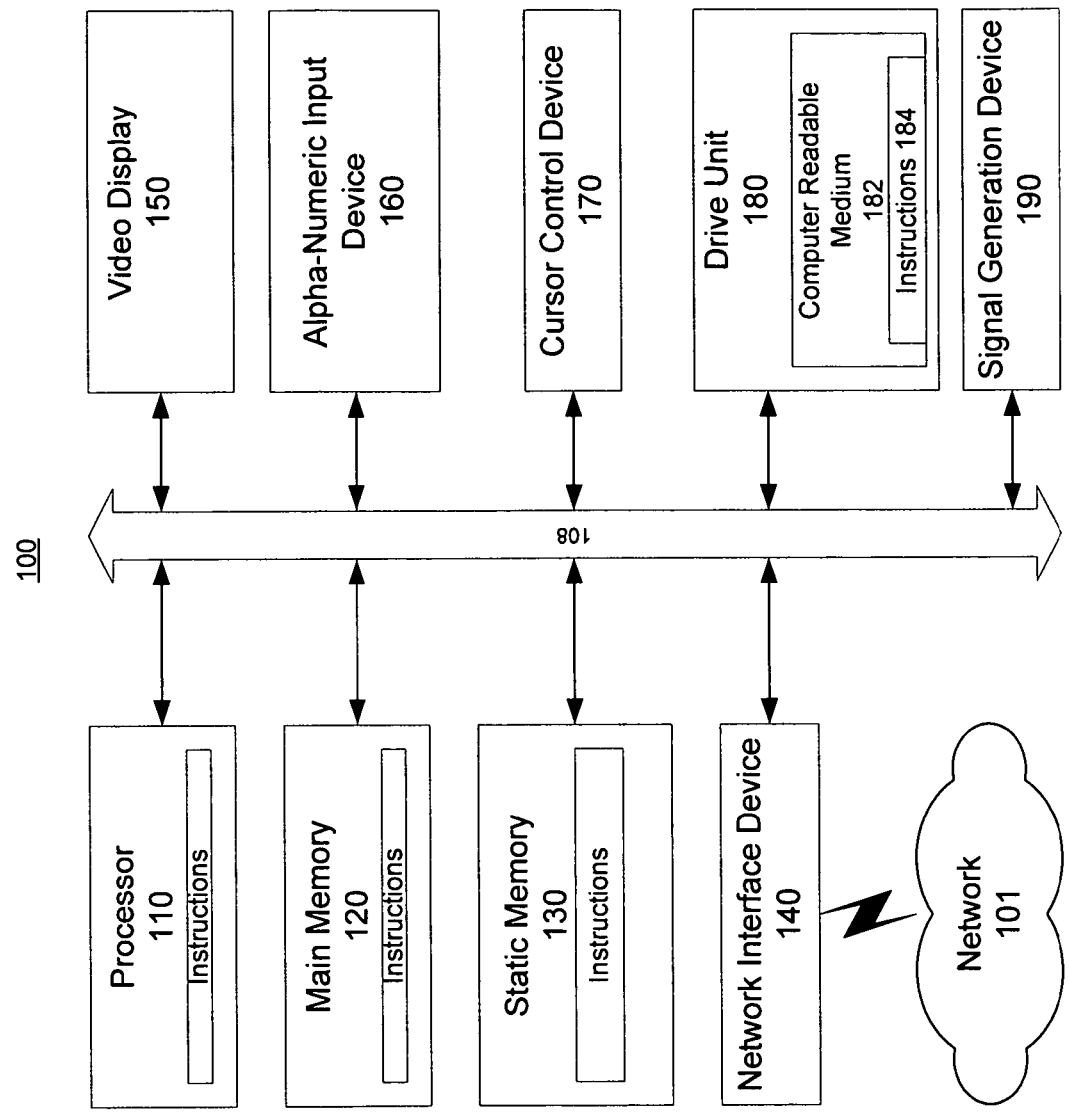
FIG. 1 shows an exemplary general computer system that includes a set of instructions for performing processing, according to an aspect of the present invention.

In view of the foregoing, the present invention, through one or more of its various aspects, embodiments and/or specific features or sub-components, is thus intended to bring out one or more of the advantages as specifically noted below.

A system monitors signaling data transmitted between routers. The system includes at least one router that communicates signaling data via a session with at least one other router. The system also includes a network element that receives a copy of the signaling data via a control session established with the at least one router.

In one embodiment, the signaling data is border gateway protocol (BGP) data, the session is a BGP session, and the control session is a BGP control session. The network element can be a control server that performs processing on behalf of the at least one router and forwards control information to the at least one router based upon the processing. The control server can perform centralized route policy control. The BGP session can be associated with an identifier that indicates an address of the control server and an identifier that indicates whether the data from the BGP session will be transmitted to the control server.

The network element can be a monitor server that receives a copy of all BGP data via the BGP control session. The BGP session may be associated with a monitor group identifier that designates a class of the session, the class being either a settlement free peer class, a transit network class, or a customer class.

A centralized routing policy management device for use in a network includes routers that communicate using border gateway protocol (BGP). The device includes a receiver that receives BGP data from routers via BGP control sessions, and a policy analysis section that applies policy to the received BGP data. The device also includes a transmitter that transmits routes back to the routers via the BGP control session, based upon the applied policy.

A computer readable medium stores a program for monitoring border gateway protocol (BGP) data via a BGP control session established between a monitor server and a router. The program includes a mirror code segment that transmits BGP data, sent between routers, to the BGP control session.

In another aspect, a router enables monitoring of border gateway protocol (BGP) data via a BGP control session established between a monitor server and the router. The router includes a session establishment section that establishes BGP sessions with other routers for communicating BGP data, and establishes the BGP control session with the monitor server. The router also includes a mirror section that mirrors BGP data communicated via the BGP sessions, the mirroring including transmitting a copy of the BGP data to the monitor server via the BGP control session.

The router can include a class designator that associates each BGP session with a class identifier that indicates whether the BGP session is established with a settlement free peer, a transit network, or a customer. The BGP control session can be designated as export only when established, so that the BGP control session receives monitored data. The BGP control session can be designated as disabled when established, so that the BGP control session does not receive monitored data.

In yet another aspect, a border gateway protocol (BGP) network element includes a processor that performs best path processing on behalf of the routers; and a receiving system that receives BGP data from the routers. The element also includes a transmitter that transmits control information to the routers based upon the received BGP data and the processing. The processor can perform processing for inbound policy of the routers. The receiving system can receive indicators along with the received data, the indicators indicating a class of the received BGP data.

In still another aspect, a computer readable medium stores a program for controlling external processing executed on behalf of routers. The program includes a receiving code segment that receives border gateway protocol (BGP) data from the routers; and a processing code segment that performs best path processing on behalf of the routers based upon the received BGP data. The program also includes a transmitting code segment that transmits control information to the routers based upon the received BGP data and the processing.

A computer readable medium stores a program for externally controlling processing of routers. The program includes a transmitting code segment that transmits a copy of border gateway protocol (BGP) data to an external processor via a control session. The program also includes a receiving code segment that receives control information from the external processor via the control session. The control information is calculated by external processing of the transmitted BGP data.

In another aspect, a computer readable medium stores a program for execution within a centralized routing policy management system including a network of routers communicating using border gateway protocol (BGP). The program includes a session establishment code segment that establishes BGP sessions amongst routers for communicating BGP data, and establishes a BGP control session with an external processor. The program also includes a mirror code segment that mirrors BGP data communicated via the BGP sessions. The mirroring includes transmitting a copy of the BGP data to the external processor via the BGP control session. The program also includes a receiving code segment that receives BGP data via the BGP control session; and a policy analysis code segment that applies policy to the received BGP data. The program also includes a transmitting code segment that transmits routes via the BGP control session, based upon the applied policy; and a receiving code segment that receives routes from the external processor via the BGP control session. The control information is calculated by external processing of the transmitted BGP data.

An aspect of the present invention is directed to relaying data from routers. The information can be used by an external processor, thus providing the ability to offload some processing from the router. Alternatively, or in addition, the network element receiving the data can operate as a centralized policy manager.

Referring to FIG. 1, a description is now provided of an illustrative embodiment of a general computer system 100, on which the monitor, relay, and policy manager can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
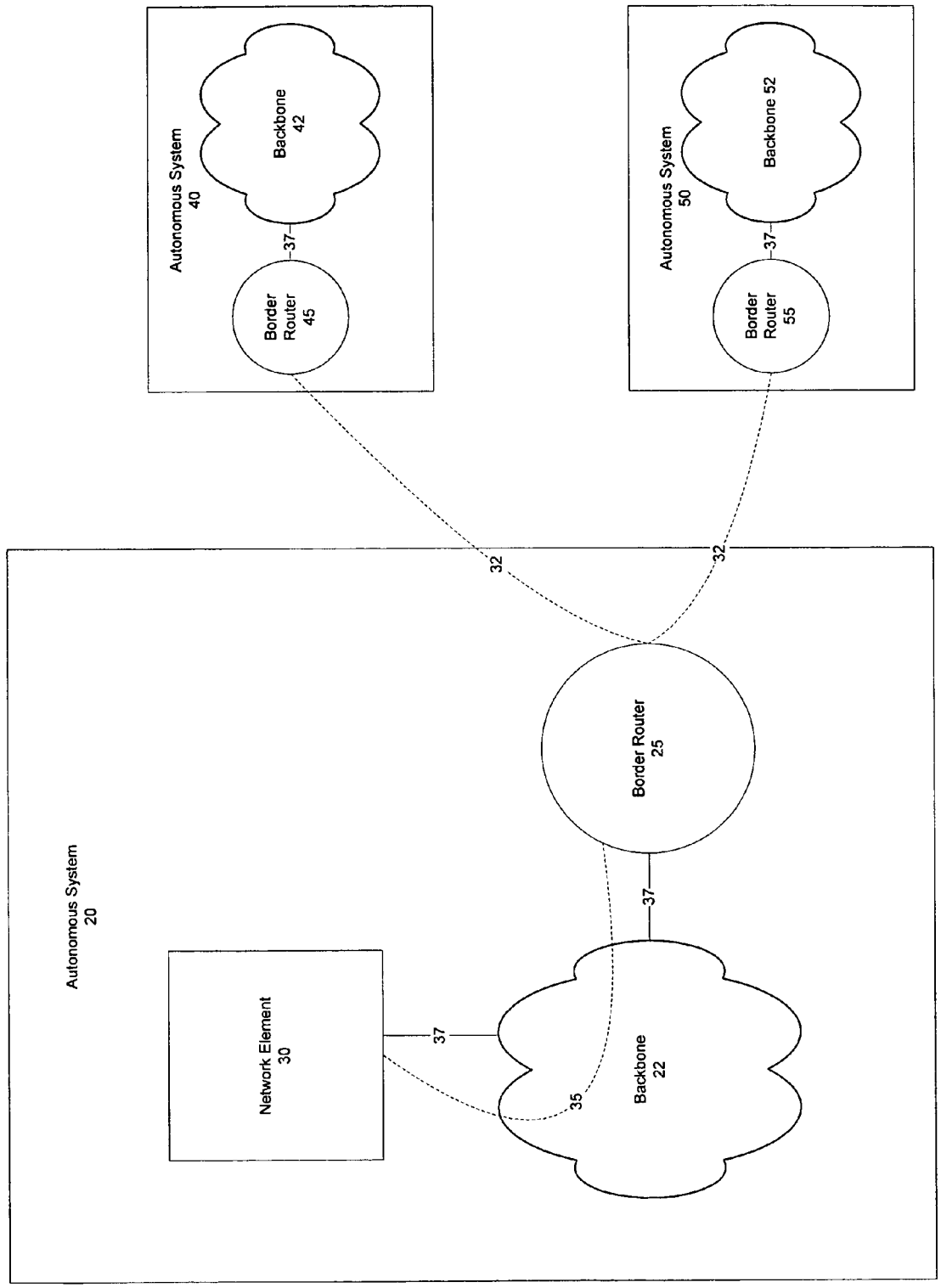
FIG. 2 shows an exemplary network architecture for implementing a monitor, relay, and policy manager, according to an aspect of the present invention.

Using a general computer system as shown in FIG. 1, a routing policy managing device, control server, and/or monitor server may be provided. The system of FIG. 1 can also operate as a router processing according to an aspect of the present invention. As seen in FIG. 2, autonomous systems 20, 40, 50 each include a backbone 22, 42, 52, and border router 25, 45, 55. Although only a single border router is shown within each autonomous system, 20, 40, 50, additional border routers can be provided. The dashed lines 32, 35 represent sessions, whereas the solid lines 37 represent physical circuits.

Monitor

According to an aspect of the present invention, a border gateway protocol (BGP) monitor mechanism can be provided to monitor individual sessions 32. The sessions being monitored can be BGP sessions. In one embodiment, the monitor mechanism is implemented as an upgrade to a router, enabling monitoring to occur at a level that cannot be accomplished without additional hardware and analysis devices. A goal of this mechanism is to mirror received/transmitted data on an existing BGP session 32 to a designated host 30. In this embodiment, the designated host will be referred to as a monitor server 30. The signaling data can be transferred to the monitor server 30 using BGP across a monitor session 35. The monitor server 30 can be a general purpose server, or can be another router. Once router vendors adopt this capability, additional products could be designed to utilize it.

The monitoring mechanism mirrors one or multiple BGP sessions 32 to the monitor session 35. In one embodiment, the monitor session 35 is a BGP session that only supplies mirrored BGP information. All BGP messages remain intact from the point where the messages are received to transmission to the monitor session 35. Although FIG. 1 only shows a single router 25 operating as a monitor, additional routers within a system could also be upgraded and then designated as monitors.

An operator of the router 25 can define several parameters. Each of the configurations can be enabled for each peer or for each peer-group. For example, a BGP Monitor Group Identifier can define a BGP session within a monitor group. That is, each ID can designate a session as belonging to a particular class, such as a settlement peer class, a transit network class, and a customer class. A BGP Monitor Export Identifier can define an address to where data from a particular class is sent. Such an ID is only applicable, of course, if multiple hosts 30 are present. An example of an implementation of a BGP Monitor Export Identifier would be to send all customer class data to a first host, and send all other data to a second host.

Another parameter that can be defined is a BGP Monitor Session Control parameter, which configures a session 35 to be opened between the router 25 and the monitor server 30. This parameter can be assigned a value of "export only" indicating that an established monitor session 35 will receive exports. Alternatively, the session can be designated as "disabled," in which case the session is created for other purposes, as described below. In the "disabled" case, the monitor session 35 is permitted to be established, but the router 25 does not advertise any prefixes or monitored data.

An advantage of such a system is that an operator can view what routes are being received from their peers. This capability will allow NMS/EMS systems to have a better visibility into the routing tables of networks. With this better visibility, operators can determine if potential routing leaks are occurring or if a remote network is attempting to influence a network's routing policies unannounced.

Relay

In a BGP relay embodiment of the present invention, a border router 25 offloads processing, (for example, BGP best-path processing) to an alternate network element (router or server) 30. In this embodiment, the network element 30 will be referred to as a central policy enforcer or BGP control server 30. This embodiment allows easy, non-disruptive migration to a central policy enforcer 30. In fact, it is believed that there is no method for other networks to even determine the occurrence of offloading calculations. In a specific embodiment, the BGP relay capability permits existing BGP sessions to function currently as is, but the router 25 does not participate in any best-path calculations on routes received. Although not shown, more than one BGP control server 30 can exist.

The BGP relay embodiment has at least two benefits: border routers 25 offload complicated route policy and route calculation functions to an alternate network element 30, resulting in the border router 25 performing fewer functions and having lowered CPU utilization. In addition, an alternate element 30 could perform centralized route policy control across the network, simplifying a network's ability to set a network-wide route policy without having to worry about mis-configurations on multiple border routers 25 in the network.

A BGP control server 30 can feed routing policy information to a router 25. In this embodiment, the BGP control session 35 advertises routes to the router 25. In other words, the BGP control session 35 is defined as a session that will inform the router 25 of its routing policies. This results in the border router 25 being a route-reflector-client of the control server 30.

A BGP Relay-Enabled Session refers to a BGP session that is designated to have its routes transmitted to the control server 30 for policy processing. Routes learned from a neighbor 45, 55 will not have best-path calculations performed by the router 25 terminating the BGP session 32. However, routes advertised to these peers 45, 55 would continue as normal.

Routing Policy Manager

In this embodiment, the network element 30 will be referred to as a routing policy manager 30. The routing policy manager 30 can be a centralized server to establish a network's routing policy with other autonomous systems. Depending on the underlying protocols, the route policy manager 30 can use existing BGP configurations to populate routing policy to border routers 25. While the architecture is designed to be a "central" routing policy decision making system, multiple route policy manager servers 30 could be used for redundancy.

This system could communicate with routers 25 via BGP or another TCP based communication mechanism and allows for unique policies for each router 25 in the network. An advantage of such a product/device is the possibility for granular routing policies that can be easily managed. Exemplary types of policies include per peer global policies, per peer location specific policies, per location specific policies, and global peer policies.

Per peer global policies are routing policies that are similar at every interconnection location with a specific network. Per peer location specific policies are routing policies for each peer with unique configurations at specific locations to influence inbound and outbound routing policies. For example, agreements are sometimes made between two peers to allow for traffic to be exchanged at one location over another. The per peer location specific policies can implement such agreements.

Per location specific policies are routing policies that are unique to all or some peers at a specific interconnection location. Such a policy would be useful in attempting to alter traffic levels at a specific location for a short period of time due to capacity problems or other issues. A global peer policy is a default template to be applied to all peers.

In one embodiment, the routing policy manager 30 includes reporting capabilities. Because the routing policy manager 30 receives all updates from peers 25, 45, 55, network advertisements and withdrawals can be recorded to analyze peer behavior. Such information could be stored in a format to allow for graphs and detailed reports to be generated.

A benefit of reporting capabilities is being able to assist with troubleshooting. For example, frequently networks on the Internet make mistakes in filtering and may accidentally advertise networks that are either malicious (spoofed/stolen) or unauthorized (a peer advertising their own peers networks to increase in/out traffic ratios).

Another benefit is being able to assist in determining unfair routing policies. Some networks attempt to alter network advertisements to attempt to control another network's internal routing policies. This is typically done when a peer may not have sufficient capacity and may attempt to offload traffic on to the other network at an undesired location. The unfair routing policy causes the network to shoulder the burden of carrying traffic across costly WAN circuits.

In one embodiment, redundancy is required. In this embodiment, border routers connect to both policy managers (or all policy managers, depending on the redundancy configuration) to guarantee an architecture that results in continuity of operation. The servers can communicate via a TCP based method to synchronize configurations and policies.

Thus, aspects of the present invention permit offloading of processing to an external processor, monitoring of signaling traffic, and centralized policy control.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A system for monitoring signaling data transmitted between routers, comprising:
    at least one upgraded router having a network element exclusively assigned to the upgraded router, the network element includes a control server that performs processing on behalf of the upgraded router, wherein the upgraded router communicates signaling data via a session with at least one other router;
    wherein the network element receives a copy of the signaling data via a control session established with the upgraded router;
    wherein the upgraded router off loads route policy and route calculation functions to the assigned network element;
    wherein the assigned network element forwards processor route control information to the upgraded router;
    wherein the signaling data comprises border gateway protocol data, the session comprises a border gateway protocol session, and the control session comprises a border gateway protocol control session, and
    wherein the border gateway protocol session is associated with an identifier that indicates an address of the control server and an identifier that indicates whether the data from the border gateway protocol session will be transmitted to the control server.

2. The system of claim 1, in which the control server performs centralized route policy control.

3. The system of claim 1, in which the control server receives a copy of all border gateway protocol data via the border gateway protocol control session.

4. The system of claim 3, in which the border gateway protocol session is associated with a monitor group identifier that designates a class of the session.

5. The system of claim 4, in which the class comprises either a settlement free peer class, a transit network class, or a customer class.

6. A router that enables monitoring and controlling of border gateway protocol data via border gateway protocol control sessions established between the router and a monitor server exclusively assigned to the router, the router comprising:
    an off loading section that off loads route policy and route calculation functions to the assigned monitor server;
    a session establishment section that establishes border gateway protocol sessions with other routers for communicating border gateway protocol data, and establishes the border gateway protocol control session with the assigned monitor server;
    a mirror section that mirrors border gateway protocol data communicated via the border gateway protocol sessions, the mirroring comprising transmitting a copy of the border gateway protocol data to the assigned monitor server via the border gateway protocol control session;
    a receiving section that receives processed route control information from the assigned monitor server; and
    a class designator that associates each border gateway protocol session with a class identifier that indicates whether the border gateway protocol session is established with a settlement free peer, a transit network, or a customer.

7. The router of claim 6, in which the border gateway protocol control session is designated as export only when established, so that the border gateway protocol control session receives monitored data.

8. The router of claim 6, in which the border gateway protocol control session is designated as disabled when established, so that the border gateway protocol control session does not receive monitored data.

9. A border gateway protocol network element for use with routers, the network element comprising:
    a storage device that stores route policy and route calculation function criteria that are off loaded to the network element from the routers;
    a processor that performs best path processing on behalf of the routers based on the stored route policy and route calculation function criteria and border gateway protocol data;
    a receiving system that receives border gateway protocol data from the routers; and
    a transmitter that transmits best path route control information to the routers based upon the received border gateway protocol data and the processed route policy and route calculation function criteria via border gateway protocol control sessions,
    wherein the receiving system receives indicators along with the received data, the indicators indicating a class of the received border gateway protocol data, in which the class comprises either a settlement free peer class, a transit network class, or a customer class.

10. The network element of claim 9, in which the processor performs processing for inbound policy of the routers.

11. A system for monitoring signaling data transmitted between routers, comprising:
    at least one upgraded router having a network element exclusively assigned to the upgraded router, the network element includes a control server that performs processing on behalf of the upgraded router, wherein the upgraded router communicates signaling data via a session with at least one other router;
    wherein the network element receives a copy of the signaling data via a control session established with the upgraded router;
    wherein the upgraded router off loads route policy and route calculation functions to the assigned network element;
    wherein the assigned network element forwards processor route control information to the upgraded router;
    wherein the signaling data comprises border gateway protocol data, the session comprises a border gateway protocol session, and the control session comprises a border gateway protocol control session,
    wherein the control server receives a copy of all border gateway protocol data via the border gateway protocol control session; and
    wherein the border gateway protocol session is associated with a monitor group identifier that designates a class of the session, in which the class comprises either a settlement free peer class, a transit network class, or a customer class.

12. The system of claim 11, in which the control server performs centralized route policy control.

* * * * *